(12) United States Patent
Muraki et al.

(10) Patent No.: US 6,360,328 B1
(45) Date of Patent: Mar. 19, 2002

(54) PLURAL SAMPLING FREQUENCY SIGNAL PROCESSING BY PERFORMING DESIGNATED ROUTINES DURING SUB-MULTIPLE TIME SLOTS OF EACH PERIOD

(75) Inventors: Yasuyuki Muraki; Yusuke Yamamoto, both of Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/301,914

(22) Filed: Apr. 29, 1999

(30) Foreign Application Priority Data

| Jul. 2, 1998 | (JP) | ............................................. 10-187823 |
| Jul. 2, 1998 | (JP) | ............................................. 10-187824 |

(51) Int. Cl.$^7$ ................................................ G06F 1/04
(52) U.S. Cl. ........................ 713/501; 341/155; 713/600
(58) Field of Search ........................... 341/155; 713/501, 713/600

(56) References Cited

U.S. PATENT DOCUMENTS 5,784,601 A * 7/1998 Kisaichi ...................... 713/600
6,154,154 A * 11/2000 Suzuki et al. .................. 341/61

* cited by examiner

Primary Examiner—Kenneth S. Kim
(74) Attorney, Agent, or Firm—Morrison & Foerster LLP

(57) ABSTRACT

A digital signal processor performs signal processing corresponding to a designated one of a plurality of sampling frequencies. A slot changing device carries out changeover of slots at a frequency equivalent to a common multiple of the plurality of sampling frequencies. A slot cycle setting device sets a slot cycle formed of the slots corresponding in number to a sampling period determined by the designated one of the plurality of sampling frequencies. An executing device executes routines corresponding to the slots forming the slot cycle, with a repetition period determined by the set slot cycle, to thereby perform signal processing corresponding to the designated one of the plurality of sampling frequencies in a time-discrete manner.

3 Claims, 5 Drawing Sheets

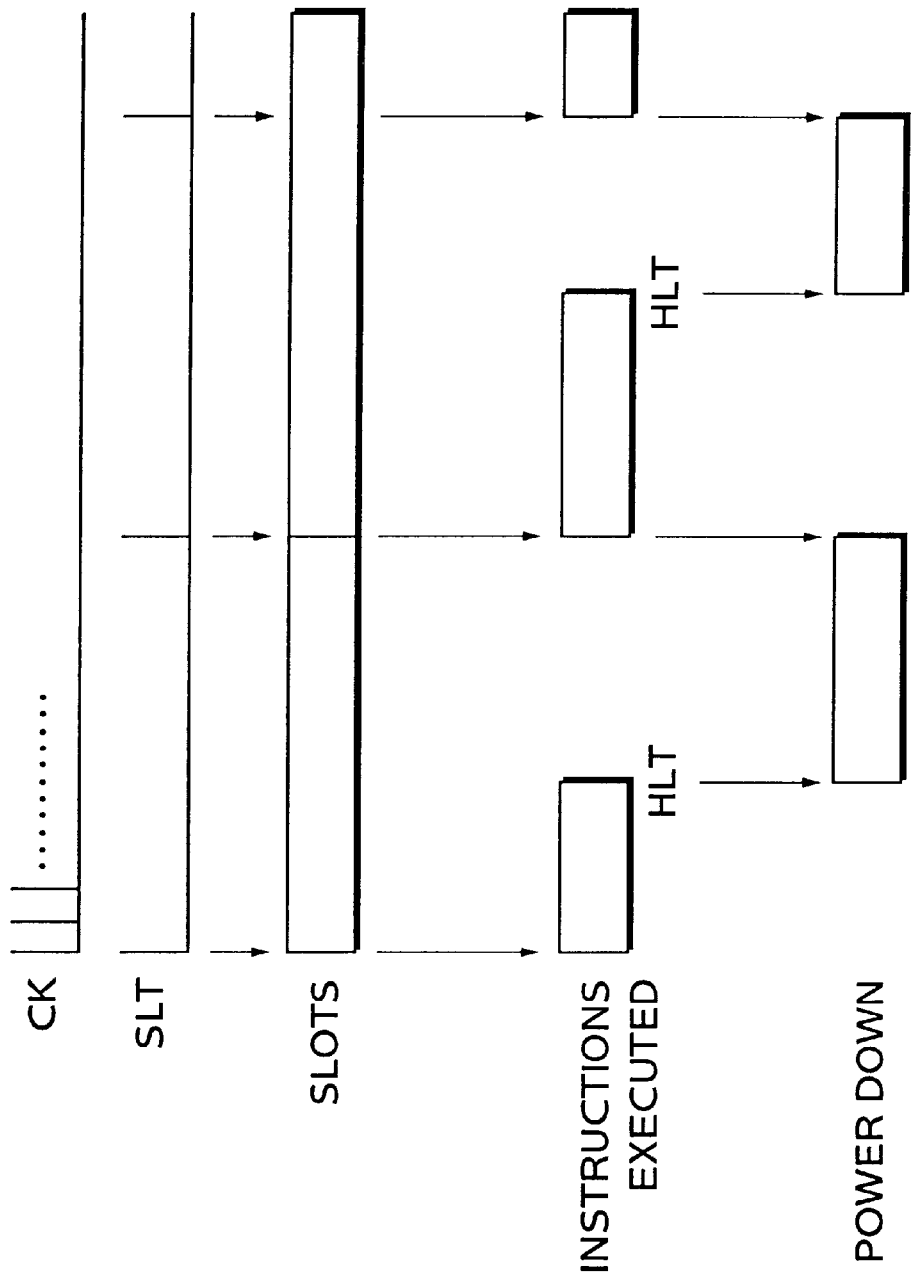

PLURAL SAMPLING FREQUENCY SIGNAL PROCESSING BY PERFORMING DESIGNATED ROUTINES DURING SUB-MULTIPLE TIME SLOTS OF EACH PERIOD

BACKGROUND OF THE INVENTION

1. Field of the Invention

This invention relates to a digital signal processor for use in modems (modulator-demodulators) and having a function of changing the sampling frequency, and a power control circuit for reducing wasteful power consumption of an electronic apparatus such as a digital signal processor.

2. Prior Art

There are many modems (modulator-demodulators) which have a function of changing the sampling frequency of a signal transmitted through a communication line, according to the status of the communication line. Therefore, DSPs (digital signal processors) installed in modems of this kind are required to have the function of changing the sampling frequency. Conventional DSPs having such a function of changing the sampling frequency include a DSP which is adapted to change the frequency of a clock for timing control of signal processing according to a designated sampling frequency, and a DSP which stores plural kinds of programs corresponding respectively to a plurality of sampling frequencies and carries out signal processing corresponding to a designated sampling frequency by selecting and executing a corresponding one of the programs.

Of the above conventional DSPs, the former DSP has a complicated circuit configuration for changing the clock frequency, while the latter DSP requires the use of a large capacity memory for storing the plural kinds of programs.

Further, various electronic apparatuses which are currently available, such as DSPs, are provided with power control circuits for reducing wasteful power consumption. Many of such power control circuits are adapted to carry out power down control (power saving control) when a certain condition is satisfied, for example, when no key input operation has been made over a certain time. Various means for power down control are employed, such as cutting off power supply to a specific circuit, and cutting off supply of a clock to a synchronous circuit or reduce the frequency of the clock.

In the above-mentioned prior art power control circuits, power down control is not carried out so long as a key input operation is made. However, even during a time period when the power down control is not carried out, main circuits within the electronic apparatus do not carry out any processing or are in a so-called idle state, while wastefully consuming electric power. This problem is not limited to a case where power down control is carried out on condition that no key input operation is made. For example, there are communication apparatuses which carry out communication using particular slots which are previously allotted, by time shared control. Many communication apparatuses of this kind are adapted to carry out power down control in a time zone other than the particular slots. In such communication apparatuses, circuits within the apparatus do not operate over the entire time period of the particular slots, but even in the particular slots there is a time period when the apparatus is in an idle state. In the conventional power down control technology, however, sufficient saving of power consumption cannot always be achieved since electric power is wastefully consumed in an unrestricted manner during the time period when the electric apparatus is in an idle state.

SUMMARY OF THE INVENTION

It is a first object of the invention to provide a digital signal processor, which has a simple construction but is capable of performing signal processing in a manner corresponding to a plurality of sampling frequencies, using a small-scaled program.

It is a second object of the invention to provide a power control circuit which is capable of reducing wasteful power consumption by circuits which are in the so-called idle state even during a time period when power down control is not carried out in the prior art, thereby achieving sufficient saving of the power consumption.

To attain the first object, according to a first aspect of the invention, there is provided a digital signal processor for performing signal processing corresponding to a designated one of a plurality of sampling frequencies, comprising a slot changing device that carries out changeover of slots at a frequency equivalent to a common multiple of the plurality of sampling frequencies, a slot cycle setting device that sets a slot cycle formed of the slots corresponding in number to a sampling period determined by the designated one of the plurality of sampling frequencies, and an executing device that executes routines corresponding to the slots forming the slot cycle, with a repetition period determined by the set slot cycle, to thereby perform signal processing corresponding to the designated one of the plurality of sampling frequencies in a time-discrete manner.

In a preferred form of the first aspect of the invention, the digital signal processor comprises a timing generating device that generates a slot timing signal indicative of timing of changeover of slots being a time unit of timing control of the signal processing, the slot timing signal having a frequency equivalent to a common multiple of the plurality of sampling frequencies, and an instruction readout clock having a frequency higher than the frequency of the slot timing signal, an instruction memory storing a program comprising groups of instructions for signal processing corresponding to the plurality of sampling frequencies, a) the program comprising a plurality of routines corresponding respectively to a predetermined number of the slots continuously arranged, b) ones of the groups of instructions for signal processing corresponding to each of the plurality of sampling frequencies being distributed in ones of the plurality of routines corresponding respectively to ones of the slots forming a slot cycle starting from a first one of the predetermined number of slots and having a length corresponding to the each of the plurality of sampling frequencies, c) a first readout control instruction being provided for the ones of the groups of instructions for signal processing corresponding to the each of the plurality of sampling frequencies, distributed in the ones of the plurality of routines, for reading out the ones of the groups of instructions for signal processing corresponding to the each of the plurality of sampling frequencies when the each of the plurality of sampling frequencies is designated, d) a second readout control instruction being provided for one of the ones of the plurality of routines corresponding to a last one of the ones of the slots forming the slot cycle, for causing execution of another one of the ones of the plurality of routines corresponding to a first one of the ones of the slots forming the slot cycle, next to execution of the one of the ones of the plurality of routines corresponding to the last one of the ones of the slots forming the slot cycle, when the each of the plurality of sampling frequencies is designated, e) a halt instruction being provided at an end of one of the routines corresponding to each of the ones of the slots forming the slot cycle, for instructing halting of reading-out of at least one corresponding group of the groups of instructions; an operation device that performs operation for signal processing according to instructions read out from the instruction memory, and an instruction readout control device that is responsive to generation of the slot timing signal, for starting reading out one of the routines corresponding to each of the slots from the instruction memory, reading out at least one of the groups of instructions for signal processing contained in the readout one of the routines according to the first readout control instruction, and delivering the readout at least one of the groups of instructions to the operation device, the instruction readout control device being responsive to the halt instruction read out from the instruction memory, for halting reading-out of the groups of instructions until the slot timing signal is again generated, and responsive to the second readout control instruction read out from the instruction memory, for starting reading out the another one of the ones of the routines corresponding to the first one of the ones of the slots forming the slot cycle when the slot timing signal is subsequently generated.

Preferably, each of the routines of the program has at least one of the groups of instructions corresponding to the plurality of sampling frequencies, and if the at least one of the groups of instructions corresponding to the plurality of sampling frequencies includes at least one group of instructions having identical contents between all or at least two of the plurality of sampling frequencies, the first readout control instruction includes designation of the all or at least two of the plurality of sampling frequencies for each of the at least one group of instructions.

To attain the second object, according to a second aspect of the invention, there is provided a power control circuit for saving power consumption of an electronic apparatus having at least one circuit, comprising a processing start detecting device that detects occurrence of an index indicative of start of execution of processing by the electronic apparatus, a processing termination detecting device that detects termination of the processing started to be executed by the occurrence of the index, and a power control device that is responsive to detection of the termination of the processing by the processing termination detecting device, for performing control of reducing power consumption of the at least one circuit of the electronic apparatus, for a time period after the termination of the processing and until next occurrence of the index is detected by the processing start detecting device.

Preferably, the electronic apparatus performs the processing using slots changed by a slot timing signal having a predetermined frequency, and the processing start detecting device detects the index indicative of the start of execution of the processing by detecting generation of the slot timing signal.

More preferably, the processing termination detecting device detects termination of the processing by detecting a halt instruction provided at an end of a routine corresponding to each of the slots, for instructing halting reading out at least one group of instructions for execution of the processing, contained in said routine.

BRIEF DESCRIPTION OF THE DRAWINGS

FIG. 5 is a timing chart useful in explaining the power down control.

DETAILED DESCRIPTION

The invention will now be described in detail with reference to drawings showing an embodiment thereof to better understand the invention. The invention is not limited to the illustrated embodiment, but any modifications and variations thereto are possible within the scope of the invention.

Figure 1:
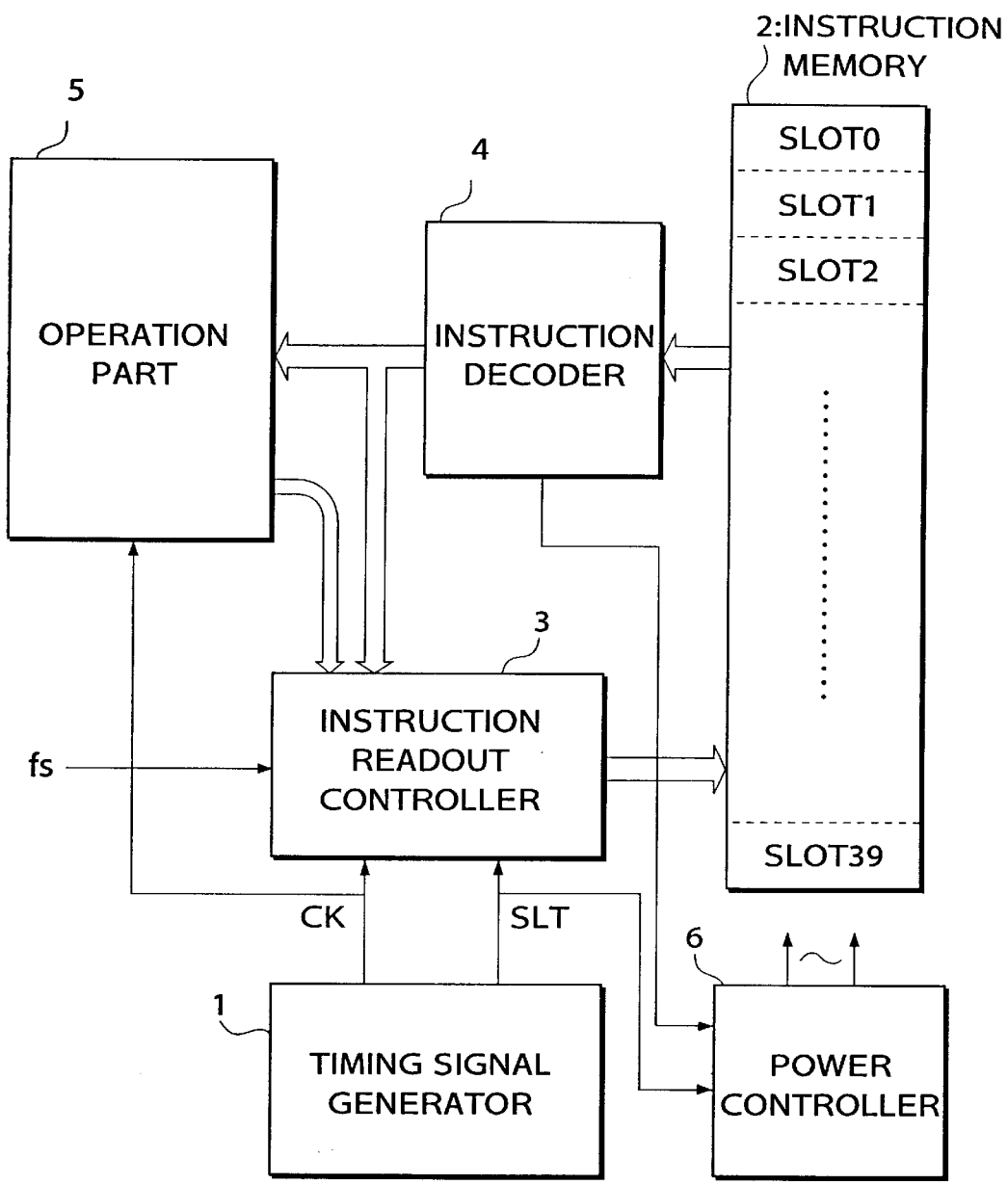
FIG. 1 is a circuit diagram showing the construction of a power control circuit and a DSP incorporating the power control circuit, according to an embodiment of the invention.

Referring first to FIG. 1, there is schematically shown the construction of a power control circuit and a DSP incorporating the power control circuit, according to an embodiment of the invention.

The DSP is installed in a modem (modulator-demodulator), not shown. As is well known, many modems have a function of changing the sampling frequency of a signal transmitted through a communication line, according to the status of the communication line. The DSP according to the present embodiment is adapted for use in modems of this kind and has the function of changing the sampling frequency.

As shown in FIG. 1, the DSP according to the present embodiment is comprised of a timing signal generator 1, an instruction memory 2, an instruction readout controller 3, an instruction decoder 4, an operation part 5, and a power controller 6. The DSP performs signal processing corresponding to a designated one of a plurality of sampling frequencies.

The timing signal generator 1 generates various kinds of timing signals used for controlling operation timing of various parts of the DSP. Important ones of the timing signals generated by the timing signal generator 1 include a slot timing signal SLT and an instruction readout clock CK. These timing signals will be described hereinbelow.

Signal processing by the DSP is carried out by executing a predetermined routine per each slot whenever the slot is changed with a predetermined period. The slot timing signal SLT indicates timing for changing the slot.

The slot is changed at a frequency equivalent to the least common multiple of the plurality of sampling frequencies. In the present embodiment, signal processings are performed, which correspond to twelve sampling frequencies from 7.2 kHz to 48 kHz. The least common multiple of these sampling frequencies is 288 kHz. Therefore, in the present embodiment, the slot timing signal SLT having a frequency of 288 kHz is generated by the timing signal generator 1.

The instruction readout clock CK instructs timing for reading instructions from the instruction memory 2. The instruction readout clock CK is generated at a higher frequency than that of the slot timing signal SLT.

The instruction memory 2 may be typically a ROM (read only memory) and stores a program for executing the signal processings corresponding to the twelve sampling frequencies.

Before explaining the contents of the program, "slot cycles" as a concept of the timing control by the DSP will be explained.

Signal processings corresponding to each sampling frequency fs have to be repeatedly executed at time intervals corresponding to the sampling period 1/fs. To carry out periodic signal processing corresponding to each of the various sampling frequencies fs, in the present embodiment, a slot cycle is formed by continuous slots corresponding in number to the sampling period 1/fs, and in the slot cycle signal processings to be executed within one sampling period are executed.

Figure 2:
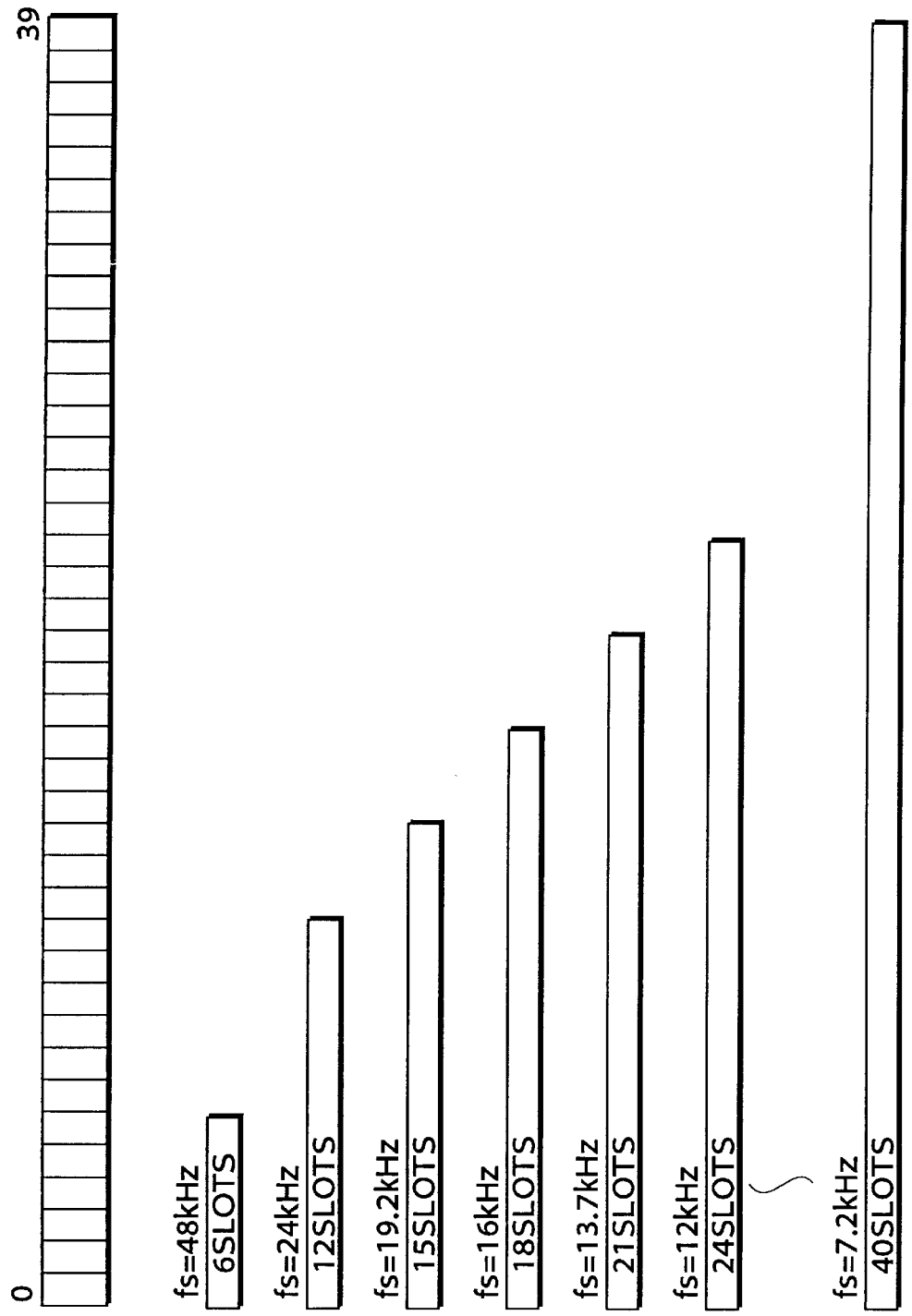
FIG. 2 is a view useful in explaining slot cycles.

FIG. 2 shows slot cycles corresponding respectively to the twelve sampling frequencies. The slot cycles coincide with each other in starting time point (the first slot of the slot cycle) but are different from each other in length. The highest sampling frequency fs employed in the present embodiment is 48 kHz, and a slot cycle corresponding to this sampling frequency is formed of six slots. The lowest sampling frequency employed in the present embodiment is 7.2 kHz, and a slot cycle corresponding to this sampling frequency is formed of forty slots. The lengths of slot cycles corresponding to the other sampling frequencies are shown in FIG. 2.

The program stored in the instruction memory 2 is formed of forty routines. These routines correspond respectively to continuous forty slots (hereinafter referred to as slots 0 to 39). Under the control of the instruction readout controller 3, hereinafter described, routines corresponding to respective slots are executed. For example, at the slot 0, a routine corresponding to the slot 0 is executed, at the slot 1, a routine corresponding to the slot 1 is executed, and so forth. However, all routines corresponding to the forty slots are not always executed. More specifically, routines corresponding to a slot cycle determined by the designated sampling frequency are periodically executed such that if the designated sampling frequency fs is 48 kHz, for example, routines corresponding to the slots 0–5 are executed, while if the designated sampling frequency fs is 24 kHz, for example, routines corresponding to the slots 0–11 are executed.

Groups of instructions for signal processing corresponding to each sampling frequency fs are contained in routines corresponding to a slot cycle determined by the sampling frequency. For example, in the case of the sampling frequency of 48 kHz, groups of instructions for signal processings to be executed within one sampling period 1/48 kHz are contained in routines corresponding to the slots 0–5 stored in the instruction memory 2. Further, in the case of the sampling frequency of 7.2 kHz, groups of instructions for signal processings to be executed within one sampling period 1/7.2 kHz are contained in routines corresponding to the slots 0–39 stored in the instruction memory 2.

This will be described more in detail hereinbelow. In the present embodiment, the following four signal processings are executed by the operation part 5 within one sampling period 1/fs:

(1) A/D FIR-1
(2) A/D FIR-2
(3) D/A FIR-1
(4) D/A FIR-2

The above signal processings (1) and (2) are FIR filtering operations carried out on a signal supplied from an A/D converter, not shown, to the present DSP, and the signal processings (3) and (4) are FIR filtering operations carried out on a signal delivered to a D/A converter, not shown, from the DSP.

Figure 3:
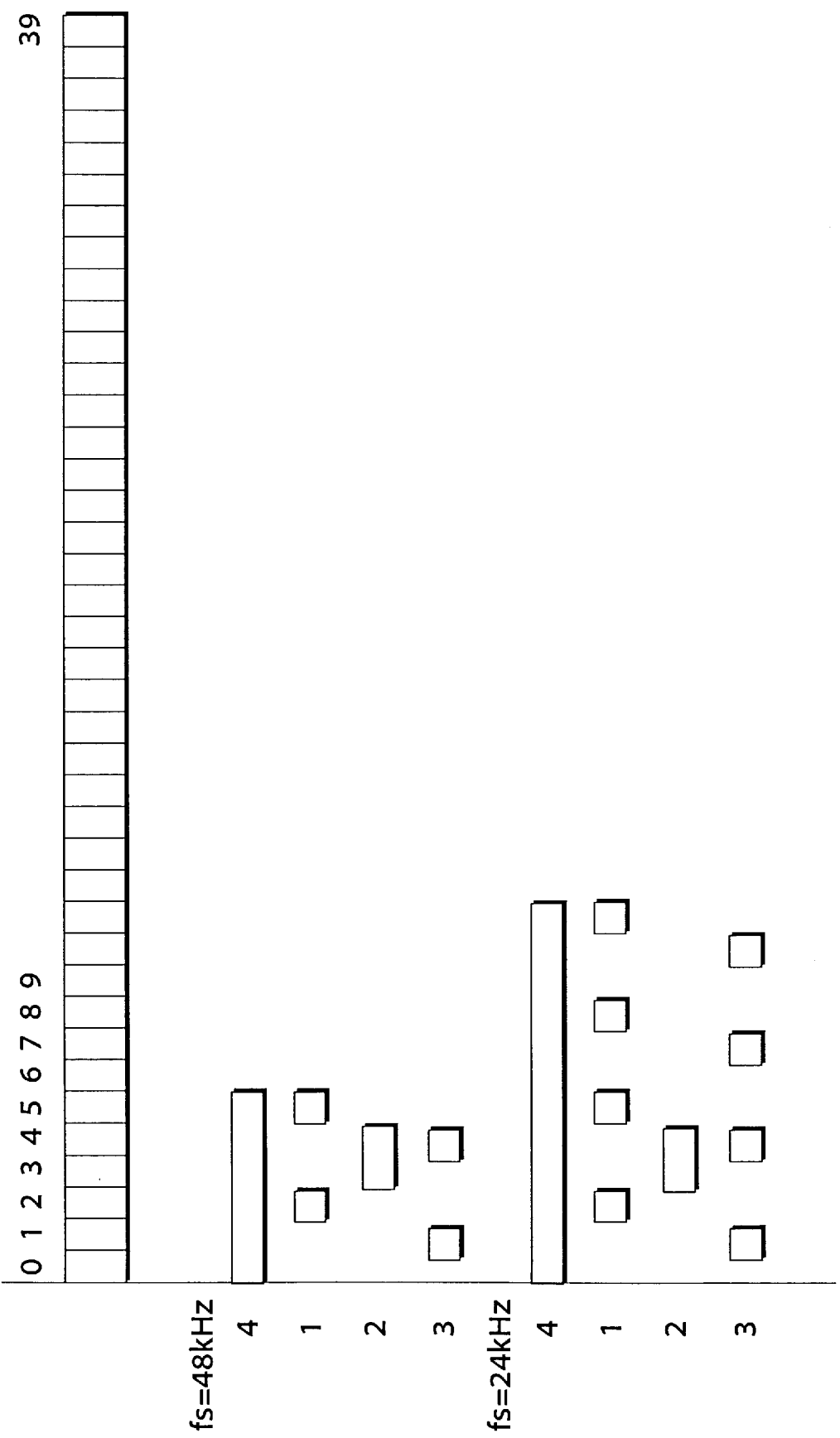
FIG. 3 is a view useful in explaining contents of signal processings corresponding to different sampling frequencies, which are carried out at slots.

Groups of instructions for the signal processings (1)–(4) are contained in routines corresponding to slots of a slot cycle equivalent to one sampling period. FIG. 3 shows, by way of example, a case where the sampling frequency fs is 48 kHz, and a case where the sampling frequency fs is 24 kHz, and in which locations of groups of instructions for the signal processings (1)–(4) are shown. As shown in the figure, in the case of the sampling frequency of 48 kHz, groups of instructions for the signal processing (1) are contained in routines corresponding to the slots 2 and 5, groups of instructions for the signal processing (2) in routines corresponding to the slots 3 and 4, groups of instructions for the signal processing (3) in routines corresponding to the slots 1 and 4, and groups of instructions for the signal processing (4) in routines corresponding to the slots 1–5, respectively.

The signal processings (1)–(4) have essentially the same signal processing contents between different sampling frequencies, though coefficients used in the operations may be changed, and only slots at which they are executed are changed according to the designated sampling frequency fs.

Accordingly, comparing between contents of instructions for executing the signal processings (1) and (4) and the timing of execution thereof, groups of instructions having just the same contents can be often executed at the same timing (slot).

Therefore, if no countermeasure is taken, for a routine corresponding to a certain slot, two or more groups of instructions which are used for signal processings corresponding to respective different sampling frequencies but have just the same contents with each other are redundantly stored, which wastefully uses the memory capacity of the instruction memory 2.

According to the present embodiment, a group of instructions which can be shared between a plurality of different sampling frequencies for a routine corresponding to each slot is shared by storing the same for common use between the different sampling frequencies.

Next, referring to a flowchart of FIG. 4, the contents of routines of the program corresponding to the slots 0–39 read out from the instruction memory 2 will be described. As shown in the flowchart, a routine corresponding to each slot includes one or more groups of instructions P, P, . . . for a plurality of signal processings.

For example, as shown in FIG. 3, at the slot 1, the signal processings (3) and (4) corresponding to the sampling frequencies of 48 kHz and 24 kHz are executed. Therefore, groups of instructions P, P, . . . for the signal processings (3) and (4) are contained in the routine corresponding to the slot 1.

Figure 4:
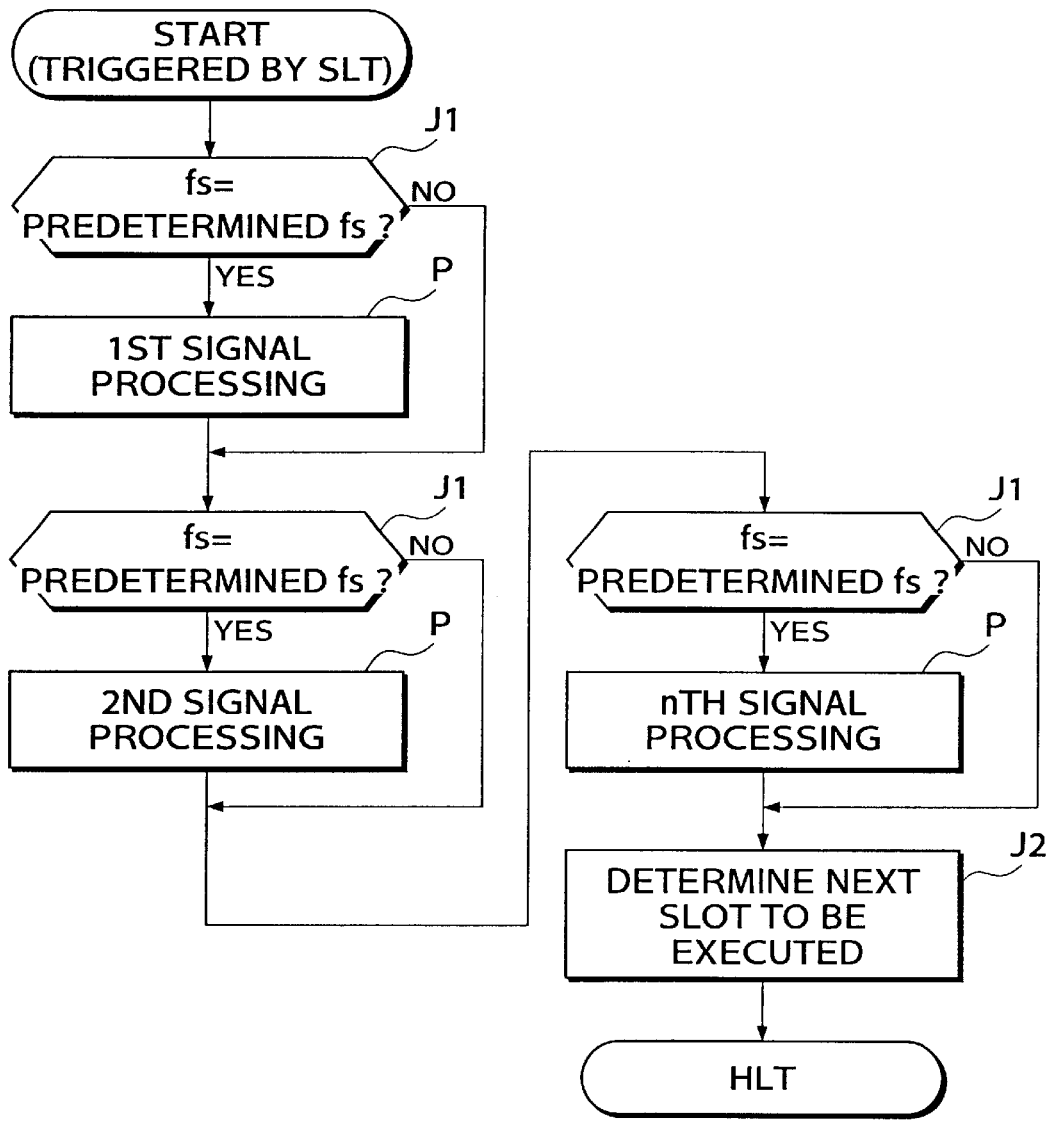
FIG. 4 is a view useful in explaining the contents of signal processings according to routines corresponding to respective slots.

As shown in FIG. 4, before execution of groups of instructions P, P, . . . for signal processings, first readout control instructions J1, J1, . . . are executed for reading out the groups of instructions P, P, . . . from the instruction memory 2 only when the presently designated sampling frequency fs is a predetermined sampling frequency. The first readout control instructions J1, J1, . . . may contain designation of a plurality of sampling frequencies as the above predetermined sampling frequency. Thus, if a group of instructions corresponding to a certain signal processing is shared between a plurality of different sampling frequencies, the first readout control instructions containing designation of all the different sampling frequencies are executed before execution of the group of instructions. In this case, when any of the different sampling frequencies is designated, reading-out of the group of instructions is carried out.

For example, in the FIG. 3 example, at the slot 1, in either of the case where 24 kHz is designated as the sampling frequency and the case where 48 kHz is designated as the sampling frequency, the signal processing (3) is executed with the same contents. Although not illustrated, even when any other sampling frequency or frequencies are designated, the signal processing (3) is executed with the same contents at the slot 1. Thus, in the routine corresponding to the slot 1, the group of instructions for the signal processing (3) is shared between the different sampling frequencies, and the first readout control instructions containing designation of all these sampling frequencies are executed before execution of the group of instructions.

Alternatively to executing the separate first readout control instructions before execution of a group of instructions, individual instructions of a instruction group may be formed by a combination of instructions for the proper signal processing, etc. and the first readout control instructions, and only when any of sampling frequencies specified by the first readout control instructions is presently designated, the instructions for the proper signal processing, etc. may be executed.

There is a case where a second readout control instruction J2 is issued or executed after execution of the group of instructions for signal processing caused by execution of the first readout control instructions. The second readout control instruction J2 is for setting the next slot to be executed to the slot 0, that is, for returning the executing slot to the first slot 0 when the slot timing signal SLT is newly generated, to start reading out a corresponding routine.

The second readout control instruction is provided in a routine corresponding to the last slot of each slot cycle. For example, if the designated sampling frequency is 48 kHz, the slot 5 is the last slot. A routine corresponding to the slot 5 is provided with the second readout control instruction J2 for setting the next slot to be executed to the slot 0 when the designated sampling frequency is 48 kHz.

When a certain slot k is not the last slot of a slot cycle, a routine corresponding to the slot k is not provided with the second readout control instruction J2. In this case, when the slot timing signal SLT is newly generated after execution of the routine corresponding to the slot k, a routine corresponding to the next slot k+1 is executed.

At the end of a routine corresponding to each slot there is provided a halt instruction HLT for instructing halting or stopping of readout of instructions from the instruction memory 2. Thus, the routine corresponding to each slot is stopped by the halt instruction HLT after its group(s) of instructions are executed. The reason why execution of instructions is stopped every slot is that the time period required for executing signal processing differs between slots.

Next, referring again to FIG. 1, various parts of the DSP will be described.

The instruction readout controller 3 performs the control of reading out instructions from the instruction memory 2, as described above. The instruction readout controller 3 starts, upon generation of the slot timing signal SLT, to execute the control of reading out a routine corresponding to a new slot, to read out individual instructions constituting the routine from the instruction memory 2 in timing synchronous with the instruction readout clock CK.

The instruction readout controller 3 receives information designating the sampling frequency fs from a control register, not shown.

When the first readout control instruction J1 is read out from the instruction memory 2, control information corresponding to the contents of the readout first readout control instruction is delivered from the instruction decoder 4 to the instruction readout controller 3. Then, the instruction readout controller 3 determines, based upon the designated sampling frequency fs, whether reading-out of a group of instructions for a signal processing to be executed immediately after reading-out of the first readout control instruction J1 is to be executed. If it is determined that the reading-out is not to be executed, the controller 3 skips over execution of the group of instructions and reads out instructions from a subsequent address.

When the second readout control instruction J2 is read out from the instruction memory 2, control information corresponding to the contents of the readout second readout control instruction J2 is delivered from the instruction decoder 4 to the instruction readout controller 3. Then, the instruction readout controller 3 returns the slot to be executed to the slot 0 when the slot timing signal SLT is generated after execution of the present routine, and performs readout address control for reading out a routine corresponding to the slot 0.

The above described instruction readout control is continuously executed in synchronism with the instruction readout clock CK until the halt instruction HLT is read out.

When the halt instruction HLT is read out, a readout halting command is delivered from the instruction decoder 4 to the instruction readout controller 3. Responsive to the readout halting command, the controller 3 stops reading-out of instructions from the instruction memory 2. Thereafter, when the slot timing signal SLT is newly generated, the controller starts reading out a routine corresponding to a new slot.

The instruction decoder 4 decodes instructions read out from the instruction memory 2 and delivers control information corresponding to the decoded instructions to the operation part 5 and the instruction readout controller 3.

The operation part 5 performs signal processing to be carried out by the DSP, and is comprised of registers, adders, multipliers, etc. The aforementioned signal processings (1)–(4) are executed by decoding instructions corresponding to these signal processings by the instruction decoder 4 and delivering the resulting control information to the operation part 5.

The power controller 6 controls power supply to the operation part 5 and the instruction memory 2. FIG. 5 is a timing chart useful in explaining power down control performed by the power controller 6.

When the readout halting instruction HLT is read out from the instruction memory 2, the instruction decoder 4 delivers halt detection information to the power controller 6. Responsive to the halt detection information, the power controller 6 performs power down control. More specifically, the input levels of the registers within the operation part 5 are set to a predetermined fixed level, a control signal is applied to a chip select terminal of the instruction memory 2 to deactivate the memory, and so forth. The power controller 6 continues the power down control over a time period after receipt of the readout halt instruction HLT and until the slot timing signal SLT is subsequently generated. When the slot timing signal SLT is generated, the power controller 6 detects this signal and terminates the power down control.

According to the present embodiment, whenever the slot timing signal SLT is generated from the timing signal generator 1, changeover of the slot is carried out, whereby a routine corresponding to the newly selected slot is read out from the instruction memory 2 under the control of the instruction readout controller 3, and interpretation and execution of the routine are carried out by the instruction decoder 4 and the operation part 5.

On this occasion, it is controlled based upon the second readout control instruction J2 such that only routines corresponding to a slot cycle determined by the designated sampling frequency fs are periodically readout from the instruction memory 2.

Further, it is controlled based upon the first readout control instruction J1 such that out of groups of instructions contained in a routine corresponding to each slot only a group or groups of instructions for one or more signal processings corresponding to the designated sampling frequency are read out from the instruction memory 2.

Therefore, according to the present embodiment, by using the instruction readout clock CK having a single frequency, signal processings corresponding to a plurality of sampling frequencies can be carried out.

Further, the time period required for signal processing to be executed can differ between slots such that in not a few slots there can be an idle time period during which no signal processing by the operation part 5 and no reading-out of instructions from the instruction memory 2 are carried out.

In the present embodiment, during this idle time period the power controller 6 performs control of reducing the power consumption by the operation part 5 and the instruction memory 2.

Although in the above described embodiment the power control circuit according to the invention is applied to a DSP having a function of changing the sampling frequency, it may be applied to a DSP of a type not changing the sampling frequency. More specifically, in a DSP in general, which performs predetermined signal processing every sampling period, there can be an idle time period during which no operation for the signal processing is carried out, within the sampling period. Therefore, to reduce the power consumption during the idle time period, means is provided in the DSP, for detecting, in each sampling period, whether all necessary processing to be executed within the sampling period has been completed, and during a time period from the detection to a time point when a new sampling period starts, the above described power down control is executed. Further, the power control circuit according to the invention can be applied to electronic apparatuses another than DSPs and, in such an application, the power control circuit according to the invention may be constructed similarly to the above described embodiment, description of which is therefore omitted.

What is claimed is:

1. A digital signal processor for performing signal processing corresponding to a designated one of a plurality of sampling frequencies, comprising:

a slot changing device that carries out changeover of slots at a frequency equivalent to a common multiple of said plurality of sampling frequencies;

a slot cycle setting device that sets a slot cycle formed of said slots corresponding in number to a sampling period determined by said designated one of said plurality of sampling frequencies; and an executing device that executes routines corresponding to said slots forming said slot cycle, with a repetition period determined by the set slot cycle, to thereby perform signal processing corresponding to the designated one of the plurality of sampling frequencies in a time-discrete manner.

2. A digital signal processor for performing signal processing corresponding to a designated one of a plurality of sampling frequencies, comprising:

a timing generating device that generates a slot timing signal indicative of timing of changeover of slots being a time unit of timing control of the signal processing, said slot timing signal having a frequency equivalent to a common multiple of said plurality of sampling frequencies, and an instruction readout clock having a frequency higher than the frequency of said slot timing signal;

an instruction memory storing a program comprising groups of instructions for signal processing corresponding to said plurality of sampling frequencies, a) said program comprising a plurality of routines corresponding respectively to a predetermined number of said slots continuously arranged, b) ones of said groups of instructions for signal processing corresponding to each of said plurality of sampling frequencies being distributed in ones of said plurality of routines corresponding respectively to ones of said slots forming a slot cycle starting from a first one of said predetermined number of slots and having a length corresponding to said each of said plurality of sampling frequencies, c) a first readout control instruction being provided for said ones of said groups of instructions for signal processing corresponding to said each of said plurality of sampling frequencies, distributed in said ones of said plurality of routines, for reading out said ones of said groups of instructions for signal processing corresponding to said each of said plurality of sampling frequencies when said each of said plurality of sampling frequencies is designated, d) a second readout control instruction being provided for one of said ones of said plurality of routines corresponding to a last one of said ones of said slots forming said slot cycle, for causing execution of another one of said ones of said plurality of routines corresponding to a first one of said ones of said slots forming said slot cycle, next to execution of said one of said ones of said plurality of routines corresponding to said last one of said ones of said slots forming said slot cycle, when said each of said plurality of sampling frequencies is designated, e) a halt instruction being provided at an end of one of said routines corresponding to each of said ones of said slots forming said slot cycle, for instructing halting of reading-out of at least one corresponding group of said groups of instructions;

an operation device that performs operation for signal processing according to instructions read out from said instruction memory; and an instruction readout control device that is responsive to generation of said slot timing signal, for starting reading out one of said routines corresponding to each of said slots from said instruction memory, reading out at least one of said groups of instructions for signal processing contained in the readout one of said routines according to said first readout control instruction, and delivering the readout at least one of said groups of instructions to said operation device, said instruction readout control device being responsive to said halt instruction read out from said instruction memory, for halting reading-out of said groups of instructions until said slot timing signal is again generated, and responsive to said second readout control instruction read out from said instruction memory, for starting reading out said another one of said ones of said routines corresponding to said first one of said ones of said slots forming said slot cycle when said slot timing signal is subsequently generated.

3. A digital signal processor as claimed in claim 2, wherein each of said routines of said program has at least one of said groups of instructions corresponding to said plurality of sampling frequencies, and if said at least one of said groups of instructions corresponding to said plurality of sampling frequencies includes at least one group of instructions having identical contents between all or at least two of said plurality of sampling frequencies, said first readout control instruction includes designation of said all or at least two of said plurality of sampling frequencies for each of said at least one group of instructions.

* * * * *